United States Patent [19]

Wahlert

[11] 3,804,240

[45] Apr. 16, 1974

[54] ARTICLE SEGREGATING APPARATUS

[75] Inventor: Stanley D. Wahlert, Westchester, Ohio

[73] Assignee: The Procter & Gamble Company, Cincinnati, Ohio

[22] Filed: July 30, 1973

[21] Appl. No.: 383,927

[52] U.S. Cl..................... 209/73, 209/74 R, 209/90
[51] Int. Cl...................................................... B07c
[58] Field of Search ......... 209/73, 74 R, 90, 91, 82, 209/121; 198/31 R, 33 AA

[56] References Cited
UNITED STATES PATENTS

| | | | |
|---|---|---|---|
| 3,409,128 | 11/1968 | Hutaff............................. | 209/90 X |
| 1,551,614 | 9/1923 | Paridon.............................. | 198/31 |
| 2,560,737 | 7/1951 | Palemer, Jr..................... | 209/90 UX |
| 3,471,012 | 10/1969 | Calhoun............................ | 209/74 R |
| 3,073,444 | 1/1963 | Bielinski et al. ................. | 209/74 R |

*Primary Examiner*—Allen N. Knowles
*Attorney, Agent, or Firm*—Richard C. Witte; John V. Gorman; Thomas J. Slone

[57] ABSTRACT

Article segregating apparatus comprising two conveyors having side-by-side portions and divergent portions in which apparatus a file of articles is received on the side-by-side portions, each received article is tipped so that it leans against and slides along a side guide and is in contact with only one conveyor, then selected articles are tilted so that they lean against and slide along a second side guide and are in contact with only the second conveyor. The apparatus further comprises guides for insuring that the tilted articles follow the second conveyor and that the tipped articles follow the first conveyor from the point of divergence of the two conveyors.

5 Claims, 6 Drawing Figures

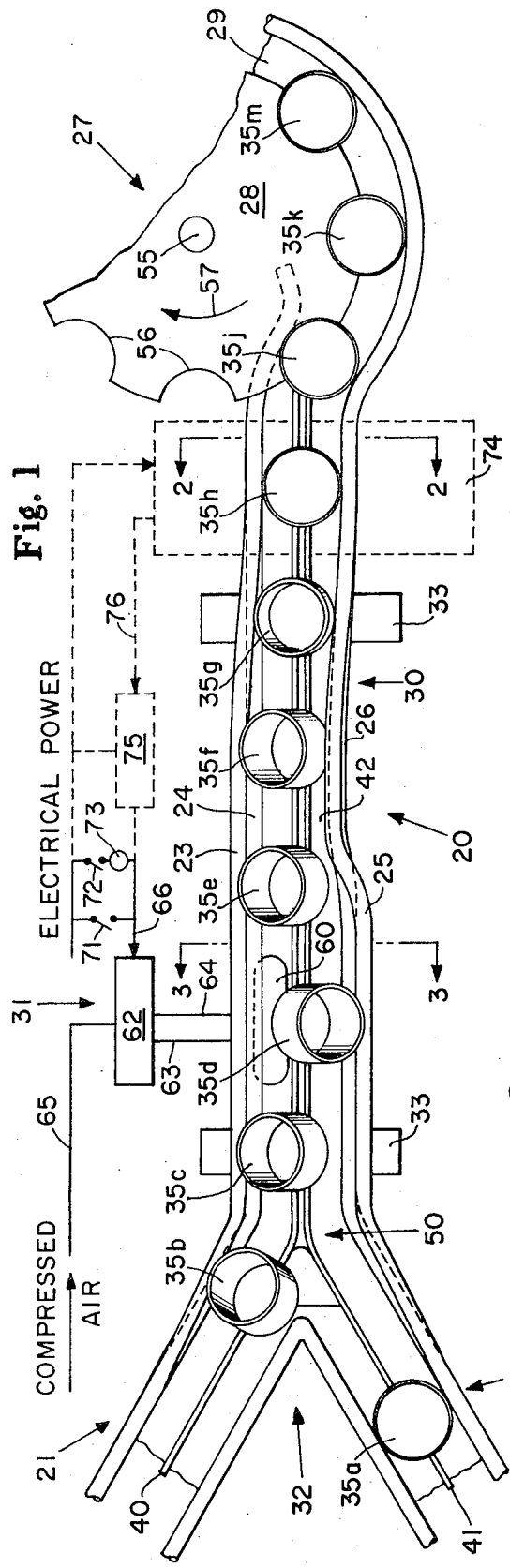
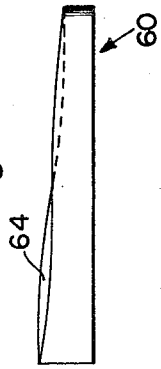
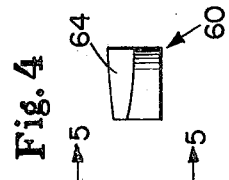
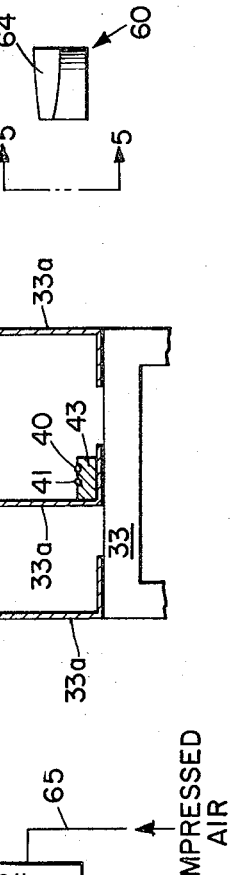
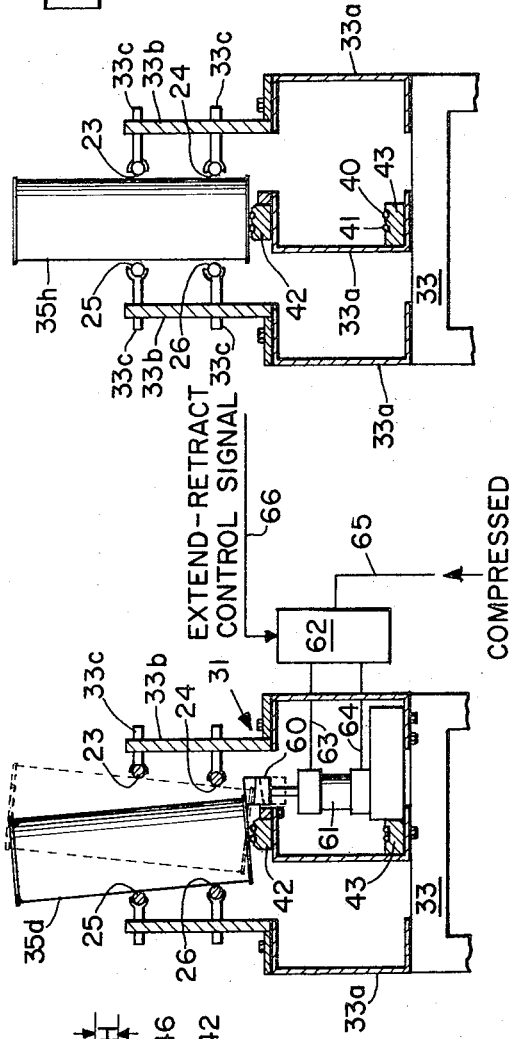
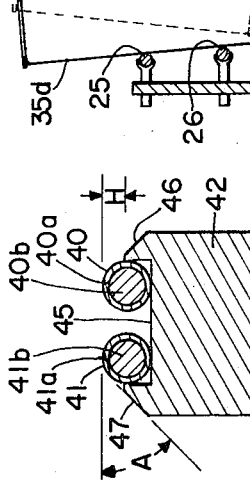

ARTICLE SEGREGATING APPARATUS

CROSS REFERENCE TO RELATED APPLICATIONS

This application is related to the commonly assigned and concurrently filed application of Stanley D. Wahlert entitled "Method of Segregation Articles Being Conveyed," filed July 30, 1973, Ser. No. 383,926.

FIELD OF THE INVENTION

This invention relates generally to providing an apparatus for segregating or dividing an incoming file of articles such as tubular cans in accordance with predetermined parametric criteria. As the term is used herein, an article segregating apparatus is an apparatus for separating acceptable articles ("good") from unacceptable articles ("bad"), as well as dividing a conveyed file of articles into sub-files or lanes such as when an upstream device can supply two or more downstream devices in parallel.

BACKGROUND OF THE INVENTION

Article segregating apparatus, which segregates articles conveyed therethrough in accordance with predetermined parametric criteria, has commonly utilized some means such as a kicker, pusher, or camming device to displace, as by sliding transversely on a conveyor belt, selected articles from the path of the articles being conveyed therethrough. Such apparatus may include means for conveying the displaced selected articles therefrom. A segregating apparatus of this type is disclosed in U.S. Pat. No. 3,003,629, issued Oct. 10, 1961 to Albert Luther Henderson.

Another type of segregation apparatus is disclosed in U.S. Pat. No. 3,472,506, issued Oct. 14, 1969 to Jacob Rabinow et al. which apparatus includes a controllable rotary diverter disposed between divergent portions of two conveyors downstream from a Y-shape juncture of the two conveyors. It has been determined, however, that the presence of an active, controllable member such as a rotary diverter at a point of divergence between conveyors is undesirable because such a downstream member may be difficult to control to achieve article-by-article segregation. Such a juncture-disposed member also results in undue congestion in an already complex area of conveying equipment. With respect to specific types of conveyors, the prior art includes U.S. Pat. No. 3,507,380, issued Apr. 21, 1970 to Steve Sarovich et al., and U.S. Pat. No. 1,226,592, issued May 15, 1917 to Henry Claude Privett, which patents both disclose cable-type conveyors. None of the discovered prior art has, however, solved the problems associated with segregating or dividing an incoming file of articles in accordance with predetermined parametric criteria in the manner nor to the degree of the instant invention.

SUMMARY OF THE INVENTION

The nature and substance of the present invention will be more readily appreciated after giving consideration to its major aims and purposes. Principle objects of the invention are recited in the ensuing paragraphs in order to provide a better appreciation of its important aspects prior to describing the details of the preferred embodiment in later portions of this description.

A major object of the invention is providing an apparatus for segregating articles which apparatus effects segregation through altering the orientation of selected articles.

Another major object of the invention is providing an apparatus for segregating a conveyed file of articles into two subfiles of articles in accordance with predetermined parametric criteria by causing each article to be disposed in a first predetermined orientation and subsequently causing selected articles to be disposed in a second predetermined orientation.

Yet another object of the invention is providing an apparatus for segregating tubular articles being conveyed on side-by-side portions of cable-type conveyors by causing each article to have an orientation such that it is propelled by only one cable conveyor, and subsequently causing selected articles to have a second orientation such that the selected articles are propelled by only the second cable conveyor.

These and other objects are achieved by providing an apparatus for segregating articles which apparatus comprises a first conveyor for forwarding articles along a first path, a second conveyor synchronized with the first conveyor for forwarding articles along a second path, a portion of said second path being in side-by-side relation with a portion of said first path, and first and second side guides extending adjacent the side-by-side portions of the conveyors on opposite sides thereof. The apparatus further comprises means for receiving and forwarding on the side-by-side portions of the conveyors a file of articles to be segregated, and means for tipping each of the articles being forwarded so that each of the articles leans against and slides along the first side guide while contacting only the first conveyor and not the second conveyor. The apparatus further includes controllable means for tilting selected articles away from the first side guide so that the selected articles lean against and slide along the second side guide while contacting the second conveyor but not the first conveyor. The apparatus further comprises means for guiding the tilted selected articles so that they are thence forwarded by the second conveyor along said second path, and means for guiding the tipped articles which have not been selectively tilted so that they are thereafter forwarded by said first conveyor along said first path.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG 1 is a fragmentary plan view of an apparatus for segregating articles which apparatus is a preferred embodiment of the present invention.

FIGS. 2 and 3 are fragmentary transverse sectional views of the article segregating apparatus shown in FIG. 1 taken along lines 2—2 and 3—3 thereof respectively.

FIG. 4 is an enlarged scale, end view of the camming block of the article segregating apparatus shown in FIG. 3.

FIG. 5 is a side elevational view of the camming block shown in FIG. 4 taken along line 4—4 thereof.

FIG. 6 is an enlarged scale, transverse sectional view of the cable track shown in FIGS. 2 and 3 having side-by-side portions of two conveyor cables disposed in an upwardly facing channel.

DESCRIPTION OF THE PREFERRED EMBODIMENT

Referring now to the drawings, and particularly to FIGS. 1 through 3, a preferred embodiment of the present invention is identified as article segregating apparatus or segregator 20. Segregator 20, FIG. 1, comprises a cable-type first conveyor 21, a cable-type second conveyor 22, a first side guide comprising upper rail 23 and lower rail 24, a second side guide comprising top rail 25 and bottom rail 26, infeed means 27 comprising starwheel 28 and platform 29, article tipping means 30, controllable article tilting means 31, guide means 32 for guiding tilted articles along the second conveyor 22 and for guiding tipped articles along the first conveyor 21, and frame 33, 33a, 33b and 33c, FIGS. 2, 3.

Briefly, in the preferred embodiment of segregator 20, a file of articles such as tubular cans 35 (cans 33a through 33m and subsequent cans) is received on side-by-side portions of the two cable-type conveyors 21, 22. Appropriately cam-configured side guides or rails cause each conveyed can to be tipped so that it leans against and slides along upper rail 23 and is propelled by only the cable 40 of the first conveyor 21. Then, selected cans are tilted while still being conveyed so that they lean against and slide along top rail 25 and are propelled by only the cable 4 of the second conveyor 22. When the conveyed cans 35 reach a point of divergence 50 of the conveyors 21, 22 guide means 32, including adjacent extended portions of rails 23 through 26, insure that cans disposed at the tipped orientation are forwarded along the path of the first conveyor 21 and the selected cans disposed at the tilted orientation are forwarded along the path of the second conveyor 22.

First conveyor 21, FIG. 1, and second conveyor 22 are of the cable-type and comprise a first endless cable 40 and second endless cable 41 respectively. The conveyors 21 and 22 further comprise cable tracks 42, 43, FIGS. 2 and 3, and suitable grooved sheaves (not shown) and drive means (not shown) for synchronously driving the two endless cables 40, 41 at substantially the same velocity. Grooved sheaves and means for driving the endless cables 40, 41 are not shown in the figures in order to promote clarity of the details of the present invention and because the application of such drive means and grooved sheaves is considered within the capabilities of persons having ordinary skill in the relevant arts.

Conveyors 21, 22 are so configured that conveyor 21 provides a first path for forwarding articles and conveyor 22 provides a second path for forwarding articles which paths have side-by-side portions disposed immediately upstream from divergent portions.

The upper cable track 42, FIGS. 2, 3, and 6, has an upwardly facing channel 45 in it for loosely accommodating cables 40, 41 in side-by-side relation throughout the length of the side-by-side portions of conveyors 21 and 22. Channel 45, FIG. 6, has a depth which is less than the diameter of cables 40, 41, so that the cables extend upwardly a distance H above the uppermost reaches of track 42. Track 42 is provided with beveled sides 46, 47 so that upwardly and outwardly facing portions of cables 40, 41 may propel containers disposed thereabove whether the articles are upright or leaning as much as A degrees to either side of vertically upright. Cable tracks 42, 43 of the preferred embodiment are made of high molecular weight polyethylene and cables 40, 41 are nylon sheathed aircraft cables in order to provide a sufficiently low coefficient of friction between the tracks and the cables 40, 41 to enable operation thereof at moderate speeds, i.e., at least as high as 150 feet per minute, without lubrication. Materials other than high molecular weight polyethylene, for example, teflon and polypropylene, may be used to fabricate cable tracks 42 and 43, and cables 40, 41 may have other than nylon exteriors, for example, polypropylene and polyethylene, to result in a coefficient of friction between the cables and the cable tracks sufficiently low to also permit operation without lubrication. Alternatively, and particularly for high speeds, lubricated tracks can be used. An example of a lubricated track is disclosed in U.S. Pat. No. 3,507,380 — Sarovich et al., referenced hereinbefore.

At the point of divergence 50 of conveyors 21, 22, the width of channel 45 in the cable track is reduced to a width sufficient to loosely accommodate only one of the endless cables in each branch of the track. Also, the radially inwardly side wall of each branch of channel 45 may be concave in order to guide and restrain the cables through the turns so that the cables do not jump out of their respective channels.

Although the preferred embodiment of segregator 20, as shown and described, comprises driven conveyors, other types of conveyors such as inclined roller conveyors are also suitable for other embodiments of the present invention for segregating such articles as articles having parallelopipedal configurations.

The infeed means 27 of the preferred embodiment of the present invention comprises starwheel 28 which may be driven, or may be freely rotatable on vertically extending shaft 55 so that it is driven by a surge of cans on an upstream conveyor. Starwheel 28 may also be provided with a controllable brake, not shown in the figures, in order to prevent infeed at such times as infeed may be undesirable. Such times may include but not be limited to the periods when the downstream conveyors are congested, or blocked. Because flow regulating infeed means and apparatus disposed upstream therefrom are not believed to constitute portions of the present invention, the infeed means 27 is shown in fragmentary form, FIG. 1, and the upstream equipment is not shown at all. Assuming that a supply of articles 35 to be sorted or divided is provided to infeed means 27, an article 35 will be forwarded by each cusp 56 disposed circumferentially about the periphery of starwheel 28 as the starwheel is rotated clockwise as indicated by arrow 57. As the articles are forwarded about the periphery of starwheel 28, they are guided by extended portions of rails 23, 25 as they slide along platform 29 and are delivered in spaced relation onto the upwardly facing surfaces of the side-by-side portions of driven cables 40, 41. They are then guided and forwarded downstream in spaced relation, towards the point of divergence 50 of conveyors 21 and 22. Although such inter-article spacing is not believed to be imperative to the present invention, such spacing does enable segregator 20 to segregate, on an article-by-article basis, more conveniently than if the articles were in abutting relation.

Referring now to FIG. 2, guide rails 23 through 26 are so disposed that articles such as tubular cans 35a through 35m delivered to the upstream end of the side-by-side portions of cables 40, 41 will be disposed in an upright orientation with their horizontally extending bottoms resting on the upwardly facing surfaces of cables 40, 41. As shown in FIG. 1, rails 23 through 26 are so configured that they cause each can, as it is being conveyed downstream, to tip far enough as indicated by can 35f so that it leans against and slides along top rail 23, is propelled by only the first endless cable 40, and loses contact with the second endless cable 41. Article 35g, FIG. 1, is shown to be partially tipped whereas articles 35f and 35e are tipped far enough to be stable; that is, their centers of gravity are so disposed that the cans will not resume their upright orientation unless acted on by an external force. Whereas rails 23 through 26 of the preferred embodiment segregator 20, as shown and described, are stationary, non-moving members of segregator 20, movable guide members such as rollers, or appropriately disposed and configured endless belts or cables may be used to enable segregation of articles which cannot be conveniently conveyed in sliding relation with a stationary rail.

Referring now to FIG. 3, the can indicated by the dash lines is shown in the stable, tipped orientation, whereas can 35d is shown in a tilted orientation so that it leans against and slides along upper rail 25 and is in contact with only second cable 41. The means for changing the orientation of cans 35 from the tipped orientation to the tilted orientation is the controllable article tilting means 31 which comprises camming block 60, actuator 61 and solenoid valve 62, and suitable means for providing extend-retract control signals to the solenoid valve 62.

Camming block 60 is shown in enlarged scale in FIG. 4, end view, and in FIG. 5, side elevational view, to be configured so that its upwardly facing surface 64 is a rolling, inclined plane which, when camming block 60 is retracted, is fully below the path of cans which are uniformly disposed at a tipped first orientation being conveyed along the side-by-side portions of conveyors 21, 22, and, when extended, is so disposed that it causes a can 35 conveyed thereacross to be tilted to a second orientation indicated by article 35d, FIG. 3.

Camming block 60, FIG. 2, is movable between an UP position (solid lines) and a DOWN position (dotted lines). The elevational position of camming block 60 may be controlled by a variety of means, three such means being indicated in FIG. 1. Electrical power may be supplied to energize solenoid valve 62 through switch 71, or through the series arrangement of switch 72 and timer 73, or a synchronized control signal may be applied to solenoid valve 62 via wire 66 through the use of an inspection means 74 such as a checkweigher and signal synchronizer 75. Thus, through operation of switch 71, the position of camming block 60 can be controlled by an operator at will to selectively divide cans between conveyors 21 and 22. Alternatively, cans can be divided between conveyors 21 and 22 on a time share basis through the use of switch 72 and a ratio timer 73 or the cans can be segregated automatically according to weight, height, or other measurable predetermined parameters through the use of an inspection means 74 disposed upstream from the camming block 60 through the use of synchronizer 75 which synchronizer may comprise a photo-electrically triggered shift register.

Through the use of automatic means for controlling the elevational position of camming block 60, an incoming file of articles can be divided into "good" and "bad" sub-files of articles on the basis of predetermined parametric criteria such as weight, size, overfill or underfill, color, and other such criteria.

Yet another means of controlling the elevational position of camming block 60, which means is not shown in the figures, comprises downstream photoelectric sensors and ancillary control means for dividing cans between conveyors 21 and 22 on an as needed basis. Such downstream photoelectric sensors can also be utilized, in conjunction with the other means for controlling camming blocks 60, to stop, through suitable means, the rotation of starwheel 28 as needed to prevent congestion on conveyors 21 and 22. Were such congestion to occur, the spaces between the cans disposed on the side-by-side portions of the conveyors would be diminished to zero which, in turn, would make article-by-article segregation more difficult.

Guide means 32, FIG. 1, including extended portions of rails 23 through 26, are configured and disposed as indicated in FIG. 1 to insure that tipped articles having a tipped orientation which are being propelled by cable 40 of first conveyor 21 and which are leaning against and sliding along upper rail 23 will follow the upper branch of the conveyor from juncture 50 and thence follow the path of the first conveyor 21, and guide means 32 are so configured and disposed that articles having the tilted orientation as indicated by article 35d which are being propelled by cable 41 of second conveyor 22 and which are leaning against and sliding along top rail 25 will follow the lower branch of the conveyor from juncture 50 and thence follow the path of the second conveyor 22.

While particular embodiments of the present invention have been illustrated and described, it would be obvious to those skilled in the art that various changes and modifications can be made without departing from the spirit and scope of the invention. Two or more segregators embodying the present invention can also be used in series to provide additional sub-file segregation or division as required by particular circumstances. It is intended to cover in the apended claims all such changes and modifications that are within the scope of this invention.

What is claimed is:

1. An apparatus for segregating articles comprising:

a first conveyor for forwarding articles along a first path, a second conveyor for forwarding articles along a second path, a portion of said second conveyor being in side-by-side relation with a portion of said first conveyor so that a part of said first path is co-extensive with a part of said second path, a first side guide and a second side guide extending adjacent the oppositely disposed sides of the side-by-side portions of said conveyors, said first side guide being spaced outwardly from said portion of said first conveyor, and said second side guide being disposed outwardly of said portion of said second conveyor, means for receiving and forwarding on said coextensive parts of said first path and said second path a file of articles to be segregated, means for tipping each of said articles to a stable, tipped first orientation so that each of said articles leans against said first side guide while being forwarded further on said first conveyor, said articles having said tipped orientation not being in contact with said second conveyor, controllable means disposed adjacent said side-by-side portions of said conveyors for tilting selected said articles away from said first side guide to a stable, tilted second orientation so that said selected articles lean against said second side guide while being forwarded further on said second conveyor, said tilted articles having said tilted orientation not being in contact with said first conveyor, means for guiding said selected articles having said tilted orientation so that they are thence forwarded by said second conveyor along said second path, and means for guiding said articles having said tipped orientation which have not been selectively tilted so that they are thence forwarded by said first conveyor along said first path.

2. The apparatus for segregating articles of claim 1 wherein said first conveyor and said second conveyor are both cable-type conveyors which each comprise an endless cable, said apparatus including means for driving said cables synchronously, said means for tipping all articles comprising a stationary guide rail having a segment thereof disposed obliquely with respect to said coextensive paths for camming each said article forwarded therepast to said stable, tipped orientation whereby the tipped said articles having said tipped orientation lean against and slide along said guide rail while being forwarded by said first conveyor.

3. The apparatus for segregating articles of claim 1 further comprising inspection means for checking each said article in said incoming file in accordance with predetermined parametric criteria, and means for controlling said controllable tilting means responsive to said inspection means whereby said articles are segregated into two sub-files in accordance with said predetermined parametric criteria, one sub-file being articles having said tipped orientation and the other sub-file being selected articles having said tilted orientation.

4. The apparatus for segregating articles of claim 1 wherein said controllable means for tilting selected articles comprises a camming block having an inclined top surface, and means for operating said camming block between a first position wholly out of the path of said articles having said tipped orientation and a second position at which said top surface of said camming block cams tipped articles conveyed therepast to said tilted orientation.

5. The apparatus for segregating articles of claim 4 wherein said camming block is moved substantially vertically by said operating means, said first position being lower than said second position, said camming block having a rolling inclined top surface for camming said articles from said tipped orientation to said tilted orientation when conveyed therepast while said camming block is disposed at said second position.

* * * * *